Aug. 25, 1936.  J. A. LAMBIE  2,052,046
IRRIGATION PIPE COUPLING
Filed May 3, 1934  2 Sheets-Sheet 1
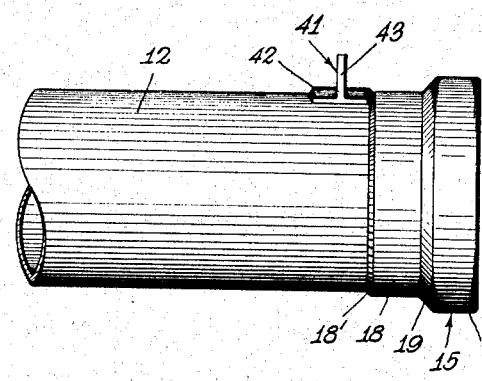
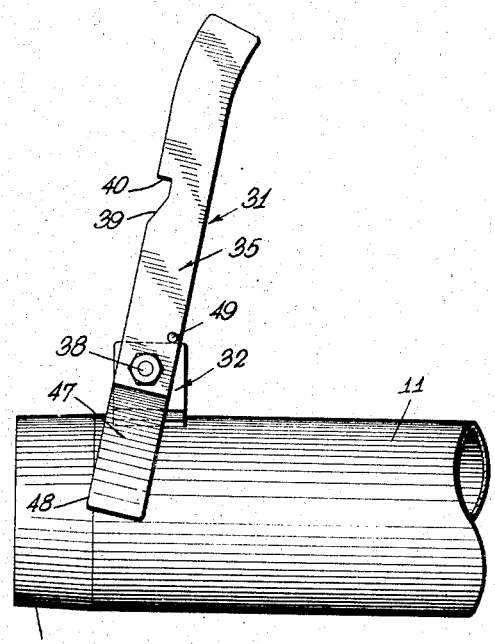
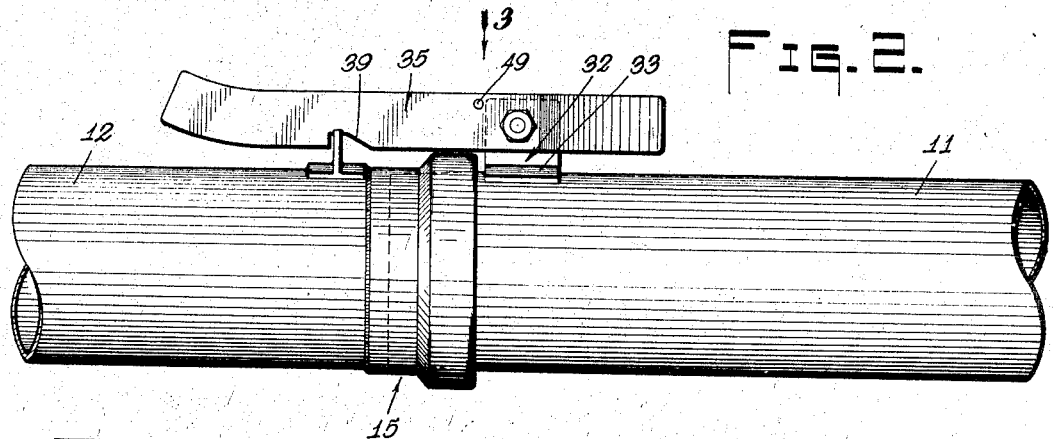
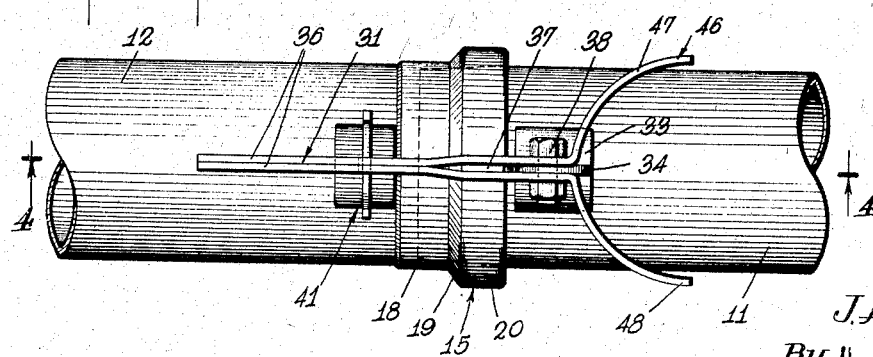
Inventor
J. A. Lambie
By Hazard and Miller
Attorneys

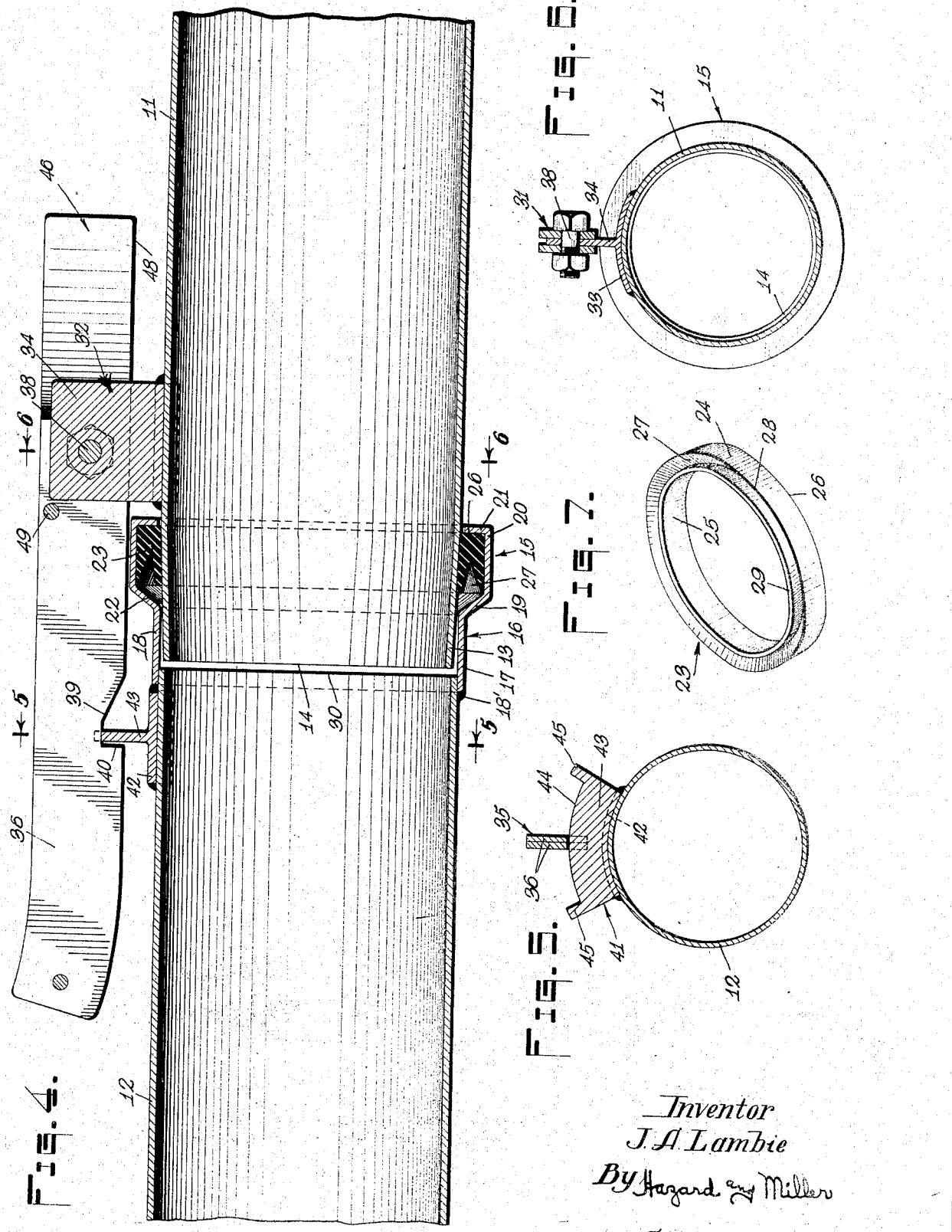

Patented Aug. 25, 1936

2,052,046

UNITED STATES PATENT OFFICE 2,052,046

IRRIGATION PIPE COUPLING

John Alfred Lambie, Los Angeles, Calif., assignor of one-half to Rain Machine, Ltd., Lompoc, Calif., a corporation of California, and one-half to West Coast Pipe & Steel Company, Los Angeles, Calif., a corporation of California Application May 3, 1934, Serial No. 723,720

9 Claims. (Cl. 285—172)

My invention relates to irrigation pipe and its couplings, particularly of a type in which the coupling forms a non-flexible or nonuniversal joint although a slight angle is permitted between two adjacent pipe lengths. This type of joint or coupling is used principally on irrigation pipes which are provided as sprinklers, sprinklers usually being of a rotary type and extending upwardly from the upper side of the pipe.

In this type of irrigation pipe and coupling, an object and feature of my invention is to form a joint or coupling which will have substantially the full inside diameter of the pipe sections and thus reduce friction losses in the flowing water at the joint.

Another feature of my invention is the employment of an expandable packing held in place by an enlarged flange on one pipe, the packing engaging the exterior of the other pipe which fits within the flange, the packing thus making a water tight seal when the pipes are under water pressure.

A further feature in regard to the packing and installation is that the packing is in the form of a ring formed preferably of rubber and fits in an annular pocket formed in the flange of the outer pipe section and is held in place by a rim. The packing ring is preferably cylindrical on both inside and outside surfaces and has an annular groove on the inside or pressure edge which permits the water to enter the groove and expand the packing to thus form a water tight seal against the flange and the inside pipe. The groove is preferably so formed that there is a relatively thick wall between the groove and the inside pipe, and the groove tapers to a feather or thin edge with the outside surfaces of the ring, this facilitating the expansion of the outer portion of the ring against the flange of the outer pipe.

Another feature of my invention relates to the construction of a clamp for holding the pipe sections together and in this connection, an object and feature of my invention is the provision of a hook pivoted on one pipe which may be hooked over a retaining member on the other pipe and thus hold the pipes in their end to end position. The hook is preferably made in the form of a lever pivoted to a lug on one of the pipes, the pivot being transverse to the axis of the pipe, and the lever is provided with a notch forming the hook which engages a transverse bracket on the other pipe section.

Another feature of my invention relates to a disengaging lever with an operating yoke, this also being formed as part of the latch hook. The yoke or jaws partly encircle the inner pipe section and may be pressed by the lever against the rim of the enlarged flange of the outer pipe section, and thus used to break or open the joint to a slight degree when the pipe is filled with water. This slight opening and breaking of the joint is sufficient to allow the pipes to be pulled apart by hand, otherwise the sealing ring may bind the pipes tightly together.

A further detailed feature in connection with the releasing jaws and yoke is a stop construction on the pivoting lug of the lever which limits the motion of said lever.

My invention is illustrated in connection with the accompanying drawings in which:

Fig. 1 is a side elevation of two adjacent pipe lengths prior to being fitted together.

Fig. 2 is a side elevation of the same pipe lengths when connected.

Fig. 3 is a plan of Fig. 2 taken in the direction of the arrow 3.

Fig. 4 is a longitudinal section on the line 4—4 of Fig. 3 in the direction of the arrows on a larger scale.

Fig. 5 is a transverse section on the line 5—5 of Fig. 4 in the direction of the arrows.

Fig. 6 is a transverse section on the line 6—6 of Fig. 4 in the direction of the arrows.

Fig. 7 is a perspective view of a resilient packing or sealing ring.

In the drawings there are illustrated two pipe sections 11 and 12. The section 11 is illustrated as having a slightly drawn in end 13 which forms the male element of the pipe coupling. The amount the portion 13 is contracted is quite slight so that the internal diameter of the end 14 is but slightly less than the inside diameter of the pipes 11 and 12. The purpose of drawing down or contracting the end 13 is to facilitate the assembly of the pipes and coupling. The pipe 12 has a socket element 15 of a coupling which forms the female element thereof, and this is made by having a flange 16 formed preferably of a spun ring having one end 17 of sufficient diameter to form a snug fit on the outside of the pipe 12. These portions are secured together by welding, as indicated at 18'. The flange then has a cylindrical section 18 and an outwardly sloping section 19, a second cylindrical section 20 and an inturned end rim or shoulder 21. There is thus formed an annular socket groove 22 in which is fitted the resilient packing ring 23 as shown in perspective in Fig. 7. This packing ring is preferably formed with cylindrical outside and inside surfaces 24—25. The outer end 26 is squared and at right angles to the axis of the ring, the inside end is provided with an annular groove 27 and the outer side of this groove forms a sharp or somewhat feather edge 28 with the outside cylindrical surface 24 of the ring, and there is a narrow flat annular surface 29 between the inside of the groove and the inside cylindrical surface 25 of the ring. The ring may readily be fitted in the annular socket groove, being insertable over the inturned end rim or shoulder 21. The cylindrical section 20 of the flange socket is substantially the same length as the length of the packing ring, and on account of the sloping portion 19, the packing ring cannot slip forwardly towards the end 30 of the pipe 12.

The pipes are secured together by a latch clamping or hook device designated by the assembly numeral 31. This employs a lug 32 which has a double flange 33 welded or otherwise secured to the outside of the pipe 11 and is provided with an upstanding web 34. A latch arm 35 is constructed preferably of two strips of metal 36 welded or otherwise secured together at their outer portion and separated at their inner portion 37 in order to straddle the web 34. A pivot bolt 38 extends through the two straps at the web and forms a pivot on which the hook web may swing in a vertical arc. This latch arm is provided with a hook notch 39 having a shoulder end 40. This hook engages a bracket designated by the assembly numeral 41 which bracket has a pair of flanges 42 extending longitudinally of the pipe 12 and located preferably close to the welded end portion 18 of the flange 16. A transverse web or plate 43 extends upwardly from the flanges 42 and it is provided with an arcuate notched peripheral portion 44 concentric with the axis of the pipe 12 and leaving two end projections 45 at opposite ends of the bracket web. I also provide a disengaging implement having a yoke 46, the yoke being formed by two substantially quarter circular arms 47 which are a continuation of the strips 36 on the opposite sides of the pivot bolt 38 from that of the hook notch 39. These hook arms extend over the upper side of the pipe 11 when the latch lever 35 is raised to the vertical position shown in Fig. 1, and the lower end portion 48 is designed to engage the rim 21 of the flange socket 16 at about diametrically opposite positions. In order to limit swinging movement of the latch lever 35 when turned upwardly, a stop pin 49 is connected between the straps 36 across the space 37 in such a position as to engage the upper edge of the web 34 when the latch lever is swung into a position as illustrated in Fig. 1, but this pin clamps the web when the hook latch is turned to a horizontal or latching position as illustrated in connection with Figs. 2, 3 and 4.

The manner of using and assembling pipes having my coupling is as follows:

Before two pipe sections are fitted together, the clamping latch or hook designated by the assembly numeral 31 preferably has the arm tilted upwardly in the position shown in Fig. 1. The slightly contracted end portion 13 of the pipe 11 may then be fitted in the socket structure formed by the flange 16, and when inserted the proper distance, the cylindrical inside surface 25 of the resilient packing ring 23 engages the outside of the pipe 11 and the latch arm 35 is rotated on its pivot rivet 38 so that the hook or notch portion 39 engages over the web or plate 43 of the bracket 41. The end projections 43 of the web prevent the latch hook from slipping off the web of the bracket should there be relative rotation between the pipes 11 and 12. This is an important characteristic when heavy sprinklers are attached to the upper side of the pipes, as the weight of the sprinkler sometimes tends to rotate a pipe on its axis. When water is forced through the pipe under pressure, the water fills the space in the socket formed by the flange 16 and enters the groove 27 formed by the expansible packing ring and this causes the outer portion 28 having the feather edge to form a liquid tight seal with the remaining portion of the resilient ring against the cylindrical section 20 of the socket member. The inner side of the resilient ring is extended inwardly pressing the inner cylindrical surface 25 outwardly against the exterior of the pipe 11 preferably at the slightly contracted section 13 and thus forms a liquid tight seal. The resilient ring therefore forms a seal both against the inner pipe 11 and in the flanged socket member of the pipe 12. It is desirable to have a slight clearance between the contracted portion 13 of the pipe 11 and the inside of the cylindrical section 18 of the flange 16 in order to facilitate the fitting together of the pipe sections. It is not necessary therefore that the end 14 of the pipe 11 abut against the end 30 of the pipe 12. This slight looseness or play allows a slight tilting of one pipe 11 in relation to the adjacent pipe 12 and still maintains a water tight joint.

When it is desired to disassemble or disconnect two pipes having my coupling or these should be sealed together rather tightly by means of the adhesion of the expansible ring 23 which is apt to occur when the ring becomes wet, the arm 35 may be swung upwardly into a substantially vertical position in order to bring the lower end portion 48 of each of the yoke arms 47 into contact with the rim 21 of the flange construction on the pipe 12. The lever 35 may then be used in a levering action to separate the two pipes in a longitudinal direction. The stop pin 49 limits the movement of this lever action but there is sufficient distance of movement permitted to break the joint or seal between the resilient ring 23 and the exterior of the pipe 11. The stop pin 49 prevents the lever arm 35 and the yoke arms 47 being tilted in a reverse direction and also functions to hold the lever 35 in a substantially upright position while the two pipe sections are being fitted together.

A characteristic feature of my invention is that the annular socket structure 15, which contains the compressible packing ring, is located substantially at the end of the enlarged structure, which is secured to the first pipe 12. Therefore, when the second pipe 11 is inserted in this socket, on account of having a small taper on its outside surface adjacent its inner end, portion 13 slides on the cylindrical inner surface of the compressible ring, which thus functions in part to guide the second pipe 11. Then, after the two pipes are latched together and fluid is forced through the pipes under pressure, this fluid passes through the annular space between the portion 18 of the enlarged socket and fills the groove 27 of the ring, thus expanding the ring and forming a water-tight seal between a peripheral portion of the second pipe 11 spaced from the end 13 of such pipe. To provide this resilient packing without the pipe 11 contacting with the inner edge of the rim 21 the resilient ring normally projects slightly inside of the inner edge of the rim.

Another important characteristic of my invention is that the latch used to secure the two pipes together also by having a yoke with two arms at the end portion pivoted to the second pipe 11 acts as a lever with the yoke bearing against the rim 21 and thus giving an initial separation of the two pipes.

Various changes may be made in the details of construction without departing from the scope of the invention as defined by the appended claims.

I claim:

1. In an irrigation pipe, a first pipe having a butt end with an enlarged cylindrical extension, and an internal annular socket structure connected to the enlarged extension, a resilient packing ring having cylindrical inner and outer surfaces fitted in said socket, a second pipe having an end portion fitted in the socket and engaging the inside surface of the ring and having an end portion extending in the enlargement beyond the socket, the said butt end of the first pipe forming a limit to the insertion of the second pipe the inside diameters of the two pipes at their butt ends being substantially equal and means to secure the two pipes together, the socket structure having an inturned shoulder and means to release the coupling comprising a hook having a pair of arms pivotally connected to the second pipe, the said arms being movable to engage the said shoulder.

2. In an irrigation pipe, a first pipe having an enlarged cylindrical extension and an internal annular socket at the outer end thereof, a resilient packing ring fitted into the said socket, the packing ring having an internal cylindrical surface of substantially the same inside diameter as the inside diameter of the cylindrical extension, a second pipe fitted in and beyond the said socket having its end portion extending within the cylindrical extension and engaging the inside surface of the said ring at a position spaced from its end and means to secure the pipes together, the means to secure the pipes together comprising a lug having a longitudinal radial web on the second pipe, a lever pivoted thereto by a transverse pintle, a transverse bracket on the first pipe and a hook notch in the lever engaging the said bracket, and a yoke to engage the cylindrical extension for disengaging the pipes.

3. In an irrigation pipe, a first pipe having a socket structure at one end, a second pipe having an end fitted in the socket structure and a resilient packing ring fitted between the said socket structure and the second pipe and engaging the second pipe at a position spaced from its end, a clamping means for the pipe comprising a lug having a longitudinal web on one of the pipes, a lever having a hook notch pivoted by a transverse pintle in the said web, the other pipe having a transverse bracket engaging in the said hook notch whereby said pipes are attached at one side only to permit a slight angular movement.

4. In an irrigation pipe, a first pipe having an end with a rim, a second pipe fitted in the end of the first pipe and extending inside of the rim, a packing between the first and second pipes, means to release the said pipes comprising a lug having a longitudinal web on the second pipe, a lever pivoted to said web by transverse pintle, a yoke having a pair of arms connected to the lever, said arms being adapted to straddle a portion of the second pipe and to engage the said rim.

5. In an irrigation pipe, a first pipe having an enlargement at one end with an internal annular socket structure terminating in a transverse rim, a resilient packing ring fitted in said socket and having a substantially inner cylindrical surface, a second pipe having a slight taper on its outer surface at an end, such end being insertable in the socket, such ring forming a bearing on which the end of the second pipe may slide for insertion in the enlarged structure, and means to attach the two pipes together whereby the ring forms a water-tight seal on the periphery of the second pipe spaced from the inserted end of such second pipe, means to separate the pipes comprising a lever having an arm, the lever being pivoted to the second pipe and engaging the end of the enlarged structure on the first pipe.

6. In an irrigation pipe, a first pipe having a butt end with an enlarged cylindrical extension and a still further enlarged internal annular socket structure with a transverse rim at the end, a resilient packing ring fitted in the annular socket and engaging the rim, said ring having a cylindrical inner surface, a second pipe having an end portion adapted to slide on the cylindrical inner surface of the ring when assembling the pipes, the butt end of the first pipe forming a stop limit for the insertion of the second pipe in the cylindrical extension, means to latch the pipes together whereby the cylindrical inner surface of the resilient ring forms a water-tight seal with the second pipe at a position spaced from the inner end of such second pipe, the means to latch the pipes comprising a lever having a pivotal mounting on the second pipe, the pivot being transverse to such second pipe, the lever having a hook engaging a transverse latching device on the first pipe, said lever on the end opposite the hook having a yoke with a pair of arms, said arms being adapted to engage the rim of the enlarged extension to initially separate the two pipes.

7. In an irrigation pipe having an annular socket adjacent one end, a resilient packing ring in the socket, a second pipe insertable in the socket and engaging said ring, means to latch the pipes together, means to separate the pipes comprising a lever pivoted to the second pipe by a transverse pivot and having an arm to engage the end of the first pipe and exert a levering action to initially separate the two pipes.

8. In an irrigation pipe, a first pipe having an enlarged cylindrical extension and an internal annular socket at the outer end thereof, a resilient packing ring fitted into the said socket, the packing ring having an internal cylindrical surface of substantially the same inside diameter as the inside diameter of the cylindrical extension, a second pipe fitted in and beyond the said socket having its end portion extending within the cylindrical extension and engaging the inside surface of the said ring at a position spaced from its end, means to secure the pipes together, the said socket structure having an inturned shoulder, the means to secure the pipes together comprising a lever pivoted to the second pipe by a pintle transverse to the axis of the pipes and spaced outwardly from the second pipe, and a latching means interconnecting the said lever and the first pipe, the lever having in addition a yoke formed of a pair of curved arms adapted to straddle the second pipe and to engage the said shoulder for withdrawing the second pipe from the socket of the first pipe.

9. In an irrigation pipe, a first and a second pipe each of the same inside and outside diameter, the first pipe having an enlarged section at one end leaving a butt, the diameter of the enlargement being substantially equal to the external diameter of the first pipe, a second enlargement forming an annular socket having a cylindrical outer wall, a sloping connection from the cylindrical wall to the first enlargement and terminating in an inturned rim at right angles to the axis of the first pipe, a resilient packing ring inserted in the annular socket and having cylindrical inside and outside surfaces, an outer end fitting against the rim, a V-shaped annular groove on the opposite edge, the outer portion of the packing at the groove having a feather edge, the second pipe being slightly tapered at its end and inserted in the rim and the ring, the cylindrical ring forming a guide in inserting the second pipe, the butt end of the first pipe forming a positive stop for the insertion of the second pipe, the packing engaging the second pipe at a position spaced from the inner end of said second pipe, and means interconnecting the two pipes and extending over the annular socket to attach the two pipes together at one side and thereby permit a slight angular movement, and means to separate the two pipes, comprising a yoke pivoted to the second pipe and straddling said pipe, the ends of the yoke being adapted to engage the said rim.

JOHN ALFRED LAMBIE.